Aug. 3, 1926.

W. I. PROUT, Jr 1,594,378

MACARONI MACHINE

Original Filed April 30, 1923    7 Sheets-Sheet 3

Inventor
William I. Prout Jr.

By
Attorney

Inventor
William I. Prout Jr.
By A. J. O'Brian
Attorney

Fig. 8.

Aug. 3, 1926.
W. I. PROUT, JR
MACARONI MACHINE
Original Filed April 30, 1923    7 Sheets-Sheet 7

1,594,378

Inventor
William I. Prout Jr.
By A. J. O'Brien
Attorney

Patented Aug. 3, 1926.

1,594,378

UNITED STATES PATENT OFFICE.

WILLIAM I. PROUT, JR., OF DENVER, COLORADO.

MACARONI MACHINE.

Application filed April 30, 1923, Serial No. 635,752. Renewed April 2, 1926.

This invention relates to a machine for making macaroni and spaghetti and is entirely automatic in its operation.

In the manufacture of macaroni the dough is put into cylinders provided at one end with die plates through which the dough is extruded by means of a piston operated by hydraulic means or by screws. The cylinders are usually placed vertically so that the extruded dough hangs vertically. A blast of air is directed onto the extruded dough tubes and dries them on the outside to such an extent that they do not stick together in handling. The operator cuts the tubes when they have attained the proper length and hangs them on rods which are then transferred to the drying chamber where they are exposed to air in motion until they are thoroughly dry when they are removed and packed into boxes for shipment.

The operation briefly described above is slow and requires the constant attention of an attendant, both of which items tend to increase the cost of production.

It is the object of this invention to produce a machine that is automatic in its operation from the time the dough is loaded into the cylinders to the time the macaroni is ready to be packed into boxes for shipment. The machine is provided with two cylinders, in the usual way, one of which is being loaded with dough while the other is operating to transform the dough into macaroni or spaghetti. The machine is provided with rectangular dies that are so constructed that the extruded tubes of macaroni are spaced from center to center a distance equal to the diameter of the tubes, so that they will be side by side on the conveyor belt which is provided for their reception. The machine is provided with means for placing the macaroni on bars and for cutting it off when the proper lengths have been produced. The bars are carried by a conveyor which transports them to another conveyor which carries them through the drying chamber. I have also provided a trimmer that cuts the ends of the macaroni as it hangs suspended from the bar. After the bars have performed their function they are placed into a hopper from which they are removed one by one and placed in operative position on the first conveyor.

The various objects above referred to are obtained by means of a mechanism which I shall now describe in detail, reference for this purpose being had to the accompanying drawings in which the preferred form of the invention is shown, and in which.

The same reference numbers will be used to designate the same parts throughout the several views.

My improved macaroni machine comprises several elements or sections which may, for the sake of clearness, be described separately, but which cooperate each with the others to produce from the dough a finished macaroni ready to be packed away into the boxes in which it is shipped.

Figures 1, 17:
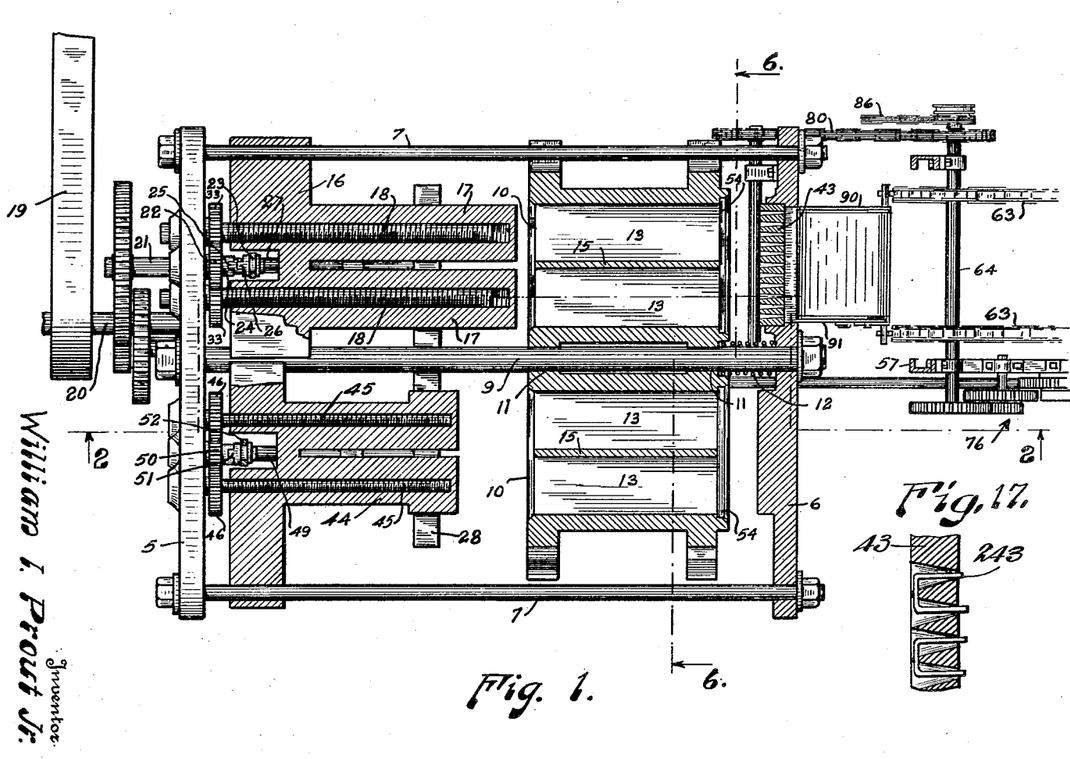
Fig. 1 is a horizontal section through the cylinders taken on line 1—1, Fig. 2.
Fig. 17 is a section showing a die having a core for making tubular macaroni.
Figures 2, 3:
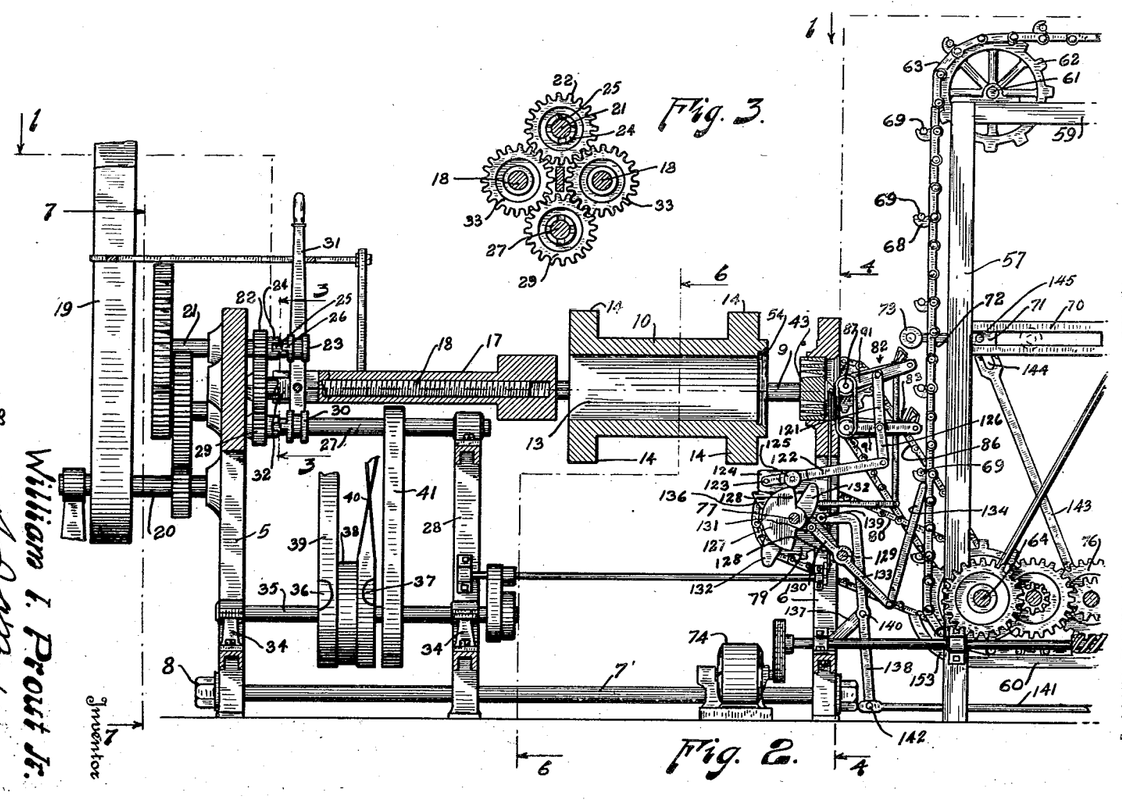
Fig. 2 is a vertical section taken on line 2—2, Fig. 1.
Fig. 3 is a section taken on line 3—3, Fig. 2, and shows the gears by which the screws are rotated.

The first section of the machine is the one which transforms the mass of dough into tubular macaroni and this is shown in Figs. 1 to 4 and Figs. 6 and 7. This section comprises two spaced supports 5 and 6 which are connected at their tops and bases by means of rods 7 and 7' which are held in place by means of nuts 8. A third rod 9 connects the upper ends of the frames 5 and 6. Rotatably mounted on the rod 9 is a pair of cylinders 10. These cylinders are substantially identical in shape and size and are preferably cast in one piece from a good grade of cast-iron or cast-steel. Intermediate the cylinders are two bearings 11 through which the supporting rod 9 extends. A coil spring 12 surrounds the rod or shaft 9 and has its ends abutting the front end of the cylinders and the support 6 and serves to normally maintain the cylinders a short distance from the support 6. The cylinders must be provided with rectangular openings 13, as a cylindrical opening would not serve the purpose in this particular type of machine for reasons that will appear as the description proceeds. The pressure required to extrude the macaroni is very great and often exceeds 1000 pounds per square inch. It is therefore evident that the cylinders must be made very strong. It is, of course, more difficult to make a square or rectangular cylinder, which will resist a large pressure, than it would be to make a cylindrical cylinder for this purpose. I therefore provide the cylinders with massive transverse bracing ribs 14, one near each end being shown in the drawing, but three or more may be used on each cylinder if it is found necessary. If the cylinder opening is made very wide, it may be necessary to form it into a plurality of substantially square openings by means of integrally formed partitions 15 and by such means it is obviously possible to make a rectangular cylinder that will withstand any pressure that may reasonably be required in the manufacture of macaroni. Slidably mounted on one of the rods 7 and on the rod 9 is a plunger 16 which is provided with two piston portions 17 which are of the proper shape and size to fit the openings 13 in the cylinders. Each plunger portion 17 has an axial opening which is threaded for the reception of a screw 18. These screws are mounted in the support 5 so as to be rotatable therein, but not slidable. The screws 18 are rotated by means of a system of gears which is shown in Fig. 3 and which will be hereinafter described. The power for driving the screws 18 inwardly for the purpose of extruding the macaroni, is supplied by the belt which cooperates with a belt wheel for the purpose of rotating the shaft 20. The power delivered to the shaft 20 is transmitted by means of a train of gears to the shaft 21 upon the inner end of which is rotatably mounted a gear 22. Slidable on but non-rotatably mounted with respect to the shaft 21 is a clutch member 23. The gear 22 has a hub 24 which is provided with notches 25 which are engaged by corresponding projections 26 on the clutch member 23. When the clutch is in the position shown in Fig. 1 the shaft 21 may rotate without rotating the gear wheel 22. Directly below the shaft 21 and parallel therewith is another shaft 27 which has one end journaled in the support 5 and the other end journaled in a support 28. Rotatably but non-slidably secured to the shaft 27 is a gear 29 which is identical with the gear 22, while slidable on but non-rotatably mounted with respect to the shaft 27, is a clutch member 30 which is identical with the clutch member 23. A lever 31 (Fig. 2) is pivoted intermediate shafts 21 and 27 to a bar 32. This lever is operatively connected to both clutch members 23 and 30 which are thereby simultaneously moved in opposite directions so that when the clutch member 23 engages the gear 22, the clutch member 30 is disconnected from the gear 29 and vice versa. When the lever 31 occupies the position shown in Fig. 2, both clutches are disconnected. The gear wheels 22 and 29 mesh with the gear wheels 33 which are immovably secured to the screws 18.

Rotatably mounted in bearings 34 which are carried by the supports 5 and 28 is a shaft 35. This shaft carries two idler pulleys 36 and 37, between which is a driving pulley 38 secured to the shaft. Belts 39 and 40 transmit power to the pulleys 36 and 37 and one of them is crossed so that pulleys 36 and 37 rotate in opposite directions. Means (not shown) are provided for moving either belt on and off the drive pulley 38. A belt 41 transmits power from the shaft 35 to the shaft 27. By using belts 39 and 40 alternately the direction of rotation of the shaft 27 can be reversed at will. When the plunger 17 is operating to extrude the macaroni it must exert a very great force and consequently move slowly. For this slow movement the clutch member 23 is employed to drive the gear 22. When the plunger is to be moved from the position shown in Fig. 1 into contact with the dough in the cylinder it is desirable to have it move with some speed, as it performs no work, and the same is true when the plunger is withdrawn from the cylinders. When the plunger 17 moves without performing work, it is driven from shaft 27 through clutch member 30 and gear 29, shaft 27 being speeded so as to make the plunger move fast. The cylinders 10 are rotatably mounted on the bar 9 and are each provided with hooks 42 which are adapted to engage one of the bars 7 to form stops. If we examine Fig. 6 it is obvious how the cylinders can be rotated in a clockwise direction until the cylinder that is now on the right side occupies a position on the left side and this will naturally bring the cylinder on the left side into alignment with the plunger 17. The object of this arrangement is to permit one cylinder to be loaded while the dough is forced out of the other cylinder. When the plunger 17 is operating to force the dough through the holes in the die 43 which may be provided with core-forming members 243, the cylinders will, of course, be forced against the face of the die and the face of support 6, since it requires a force of several thousand pounds to cause the dough to slide in the cylinder and the strength of the spring 12 is not sufficient to withstand the force exerted by the plunger. While the plungers 18 are forcing the dough out of the one cylinder, the operator is loading the empty one. For the purpose of packing the dough into the cylinder while it is being loaded, I provide a second piston which I have indicated by the numeral 44. This piston is similar to the one already described, but is somewhat shorter so as to leave sufficient space between its end and the end of the cylinder to permit the dough to be inserted therein. Piston 44 is provided with longitudinal threaded openings for the reception of screws 45 each of which is rotatably mounted in suitable bearings in the support 5 and has attached thereto gears 46 which are similar to and may be identical with the gears 33 which are similarly related screws 18. A shaft 47 is rotatably mounted in suitable bearings in supports 5 and 28 (Figs. 6 and 7) and carries the same combination of pulleys as shaft 35, which has already been described. A belt 48 transmits power from shaft 47 to a shaft 49 which is parallel to and corresponds in function to the shaft 27 and which carries a gear wheel 50 that cooperates with the gears 46 in the same manner in which gear 29 cooperates with the gears 33 (Fig. 3). The gear 50 is similar to and may be identical with gear wheel 29. The shaft 47 carries a clutch member 51 which is similar to the clutch members 23 and a lever 52, shown in section in Fig. 1, is provided for the purpose of moving the clutch member into and out of operative relation to gear 50. By shifting the belts that rotate the shaft 47 it may be made to rotate in either direction and this in turn enables the operator to move the piston 44 in either direction at will, whereby the dough can be packed into the idle cylinder. Since the piston 44 is merely used as a plunger for tamping the dough into place, it can be made to move at a comparatively high rate of speed and can be stopped instantly by releasing the clutch above described. The die 43 is rectangular in shape to correspond with the shape of the cylinder and fits snugly in an opening in the support 6 which is provided with a shoulder 53 which serves as an abutment for the die. The ends of the cylinders are provided with shoulders 54 against which the other side of the die abuts.

Figures 14, 15, 16:
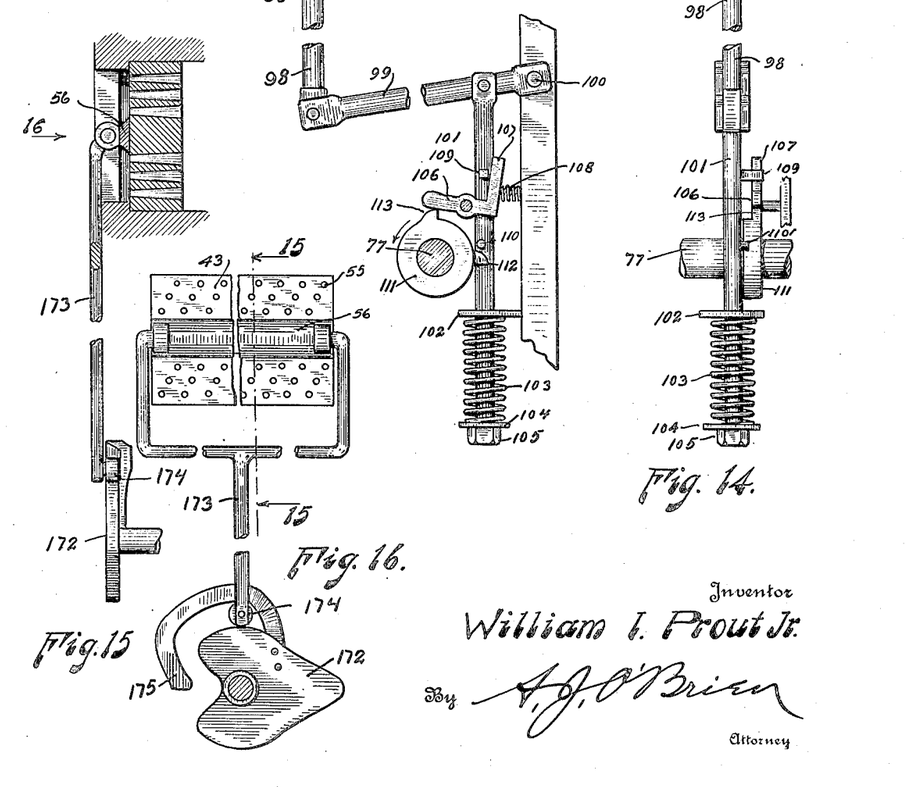
Fig. 14 is a front elevation of the parts shown in Fig. 13 taken looking in the direction of the arrow 14 in Fig. 13.
Fig. 15 is a section taken in line 15—15, Fig. 16.
Fig. 16 is a section taken on line 16—16, Fig. 15.

The die is similar to the ordinary dies used for making macaroni, except in shape and size. I make my dies rectangular for a reason that will hereinafter become clear. Ordinarily the shape of a die of this kind would be immaterial, but in this case it is of utmost importance, as in machines of this type, dies of circular shape cannot be efficiently employed. In Figs. 15 and 16 I have shown a cross-section and a front elevation of the die to a somewhat larger scale. From Fig. 16 it will be seen that the holes 55 are arranged in three horizontal rows, each slightly staggered with respect to each other in such a manner that vertical lines drawn from the sides of each hole will not intersect any of the other holes. By this arrangement it is obvious that the macaroni, as it is extruded, can be arranged in one layer on a horizontal plane without contacting with each other. In Figs. 15 and 16 it plainly appears that the openings in the die are arranged in two groups spaced apart, the reason for this being twofold. First, because a plurality of conveyors (hereinafter to be described) are employed and each group cooperates with a separate conveyor; and, second, so as to form a space for the accommodation of the knife 56 which is employed when the marcaroni is to be cut into short pieces.

From the description given above, it will be apparent that I have produced a machine that will form dough into macaroni by extruding the same through the die 43. It is now obviously necessary to provide means for automatically suspending the strips of macaroni from rods and for removing the rods and macaroni to the drying chamber.

Figure 8:
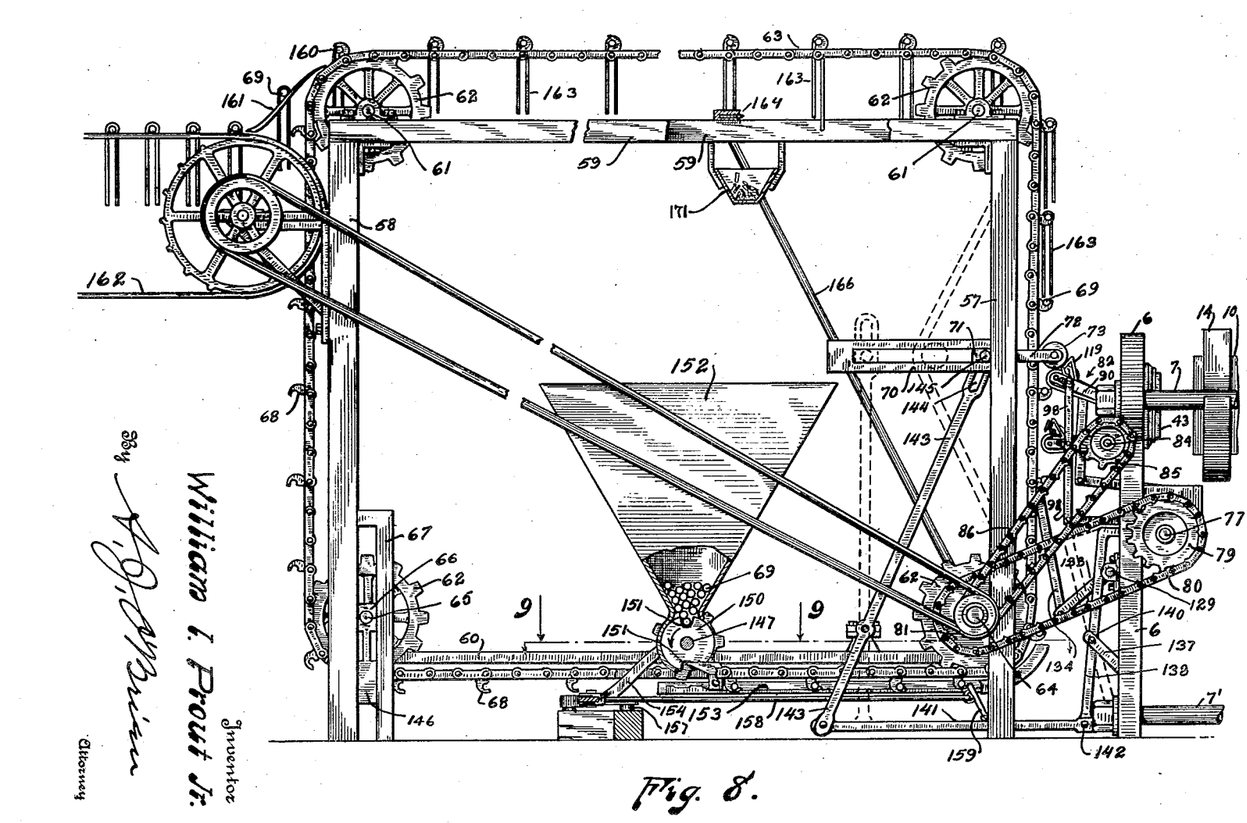
Fig. 8 is a side elevation, partly in section, of a portion of the machine with parts broken away to better show the construction.

Referring now more particularly to Figs. 2 and 8, it will be seen that a rectangular supporting framework is provided directly in front of the dies and spaced a short distance therefrom. This framework comprises two rectangular frames parallel to each other and spaced apart, each frame having vertical members 57 and 58 and a horizontal top member 59. Horizontal members 60 connect the bottom of the vertical members 57 and 58. Mounted for rotation on the upper frame members 59 are shafts 61, each carrying two spaced sprocket wheels 62 which cooperate with the chain conveyor 63. Near the bottom of the vertical members 57 there is pivotally mounted a shaft 64 which also carries spaced sprocket wheels 62. At the opposite end of the frame from shaft 64 is a fourth shaft 65 which is rotatably mounted in bearings 66 which are vertically movable in the slot formed by the vertical member 58 and the parallel guide member 67. The sprocket-chain conveyor 63 extends about the four shafts 61, 61, 64 and 65 and is carried by the sprocket wheels 62. The conveyor is provided with a number of spaced hooks 68 which carry the bars 69 from which the macaroni is suspended. Secured in horizontal position to the vertical members 57 are guides 70 within which the blocks 71 are slidingly mounted. These blocks carry arms 72 to the ends of which are mounted rollers 73 which are adapted to engage the sprocket chains and bend them forwardly into the dotted line position shown in Fig 8, whenever the blocks 71 are moved forwardly along the guides 70 which happens at definite intervals and is accomplished by means which will be hereinafter described.

Figure 4:
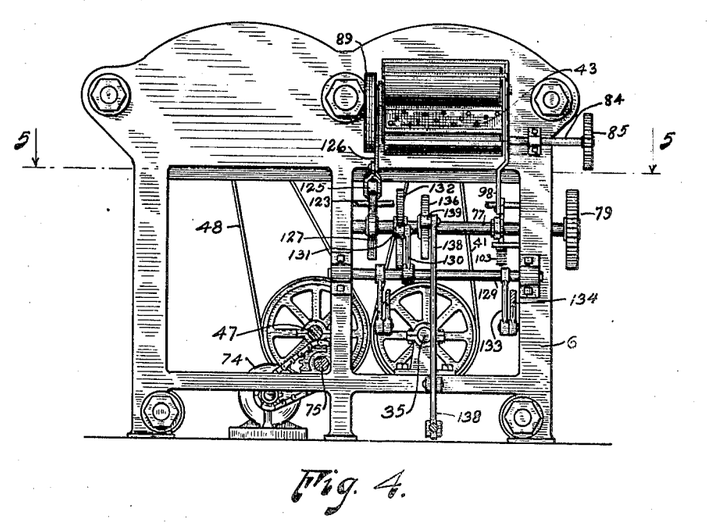
Fig. 4 is a view taken on line 4—4, Fig. 2.

The shaft 64 is rotated through power derived from an electric motor 74 and transmitted to it through a shaft 75 and a train of gears designated as a whole by numeral 76. The sprocket wheels 62 are rotatab'e on the shaft 64, the conveyor 63 being moved intermittently by another mechanism which will be hereinafter described. A shaft 77 is journaled in bearings 78 secured to the side of the support 6 and carries on its end a sprocket wheel 79. A sprocket or silent gear chain connects the wheel 79 with the wheel 81 which is non-rotatably secured to the shaft 64. Secured by suitable means to the front side of the support 6 are two conveyors 82 and 83 which are shown to an enlarged scale in Figs. 13 and 14. Conveyor 82 is pivoted at a point directly below the upper group of holes in the die 43 and conveyor 83 is pivoted below the next lower group of holes, in the manner shown in Fig. 2. I contemplate building machines of this type with three or more groups of holes in each die and will add a conveyor for each group. The conveyor 83 is pivotally mounted on a shaft 84, to the outer end of which is secured a gear or sprocket wheel 85 (Fig. 4). A chain 86 connects the sprocket 85 with a similar wheel on shaft 64 (Fig. 8). It is, of course, immaterial which of the conveyors are pivoted to the shaft 84, as the object is merely to transmit power to one or the other of them. The upper conveyor is pivoted to a shaft 87 (Fig. 13) and both shafts 84 and 87 have sprocket wheels 88 secured to them and these wheels are connected by a chain 89 so that when the shaft 84 is rotated, shaft 87 will also rotate at the same speed. Each conveyor has two side members 90 and 91, near the outer end of which is pivoted a roller 92. The shafts 84 and 87 are enlarged in diameter between the side members 90 and 91 in the manner indicated by numeral 93, and serves to drive a conveyor belt 94. When the macaroni is extruded from the dies it will fall upon the conveyor belts 94 which move at a greater speed than that at which the macaroni is extruded so as to straighten the same. As explained above, the holes in the dies are so spaced that the extruded macaroni will form a close layer on the conveyor belts 94.

Pivoted to the sides 90 are segmental gears 95. These gears are secured to the inner ends of short shafts 96 and to the outer ends of each of these shafts there is keyed a crank 97 to the outer end of which is hinged a connecting rod 98. The lower end of each bar 98 is pivoted to the front end of a lever 99, the rear end of which is pivotally connected to a stationary part of the framework at 100. A rod 101 is pivotally connected to rod 99 a short distance in front of the pivot 100 and extends downwardly passing through a bracket 102. A coil spring 103 surrounds the end of the bar 101 and has its ends abutting the bracket 102 and the washer 104 which is held in place by a nut 105. Pivoted to a stationary part of the frame is a bell crank lever 106, the upwardly projecting part 107 of which is urged in a counter-clockwise direction by the spring 107. Secured to the rod 101 is a pin 109 which is preferably square and a short distance below this pin is a round pin or a roller 110. A cam 111 is secured to the shaft 77 and rotates therewith in the direction indicated by the arrow in Fig. 13. The cam has a projection 112 which is so located that it strikes the pin 110 and moves the rod 101 upwardly until the pin 109 comes above the upper end of the lever arm 107 which will be moved into position below the same by the action of the spring 108. As the cam continues to rotate, the projection 113 will engage the horizontal portion of the bell crank lever 106 and rotate the same counter-clockwise until the part 107 is moved out of the way from the pin 109 when the spring 103 will function and pull the rod 101 downwardly to the position shown in Fig. 13. It is evident from an inspection of Fig. 13 that when rods 101 and 98 are moved upwardly the segmental gear 95 will be rotated counter-clockwise and as this cooperates with another gear 114, which is pivoted at 115, the latter will be rotated in the opposite direction. The gear 114 has an integral arm 116 which carries at its end a knife 117 which cooperates with the blade 118 to form a shear that will cut the macaroni. A bracket 119 is carried by the sides 90 and 91. These brackets carry a plate 120 which serves to clear the knife 117 of any macaroni that might adhere thereto. The side members 91 of the conveyors are connected together by means of a bar 121 so that they move in unison. A lever 122 (Fig. 2) is pivoted at 123 to a bracket 124 and carries intermediate its ends a roller 125. The free end of lever 122 has pivoted thereto a link 126 whose other end is pivoted to the lower conveyor. A cam 127 is secured to the shaft 77 and this cam has a portion, comprising substantially 180 degrees thereof in the arc of a circle of a given radius and the remaining part thereof of a much smaller radius, the two arcuate portions being joined by abrupt, almost radial, parts 128. While the roller 125 is in contact with the portion having the large radius, the conveyors will be held in the position shown in Fig. 2 and when the roller reaches the end of this cam surface, it will drop suddenly down to the other cam surface and move the conveyors downwardly.

Figure 5:
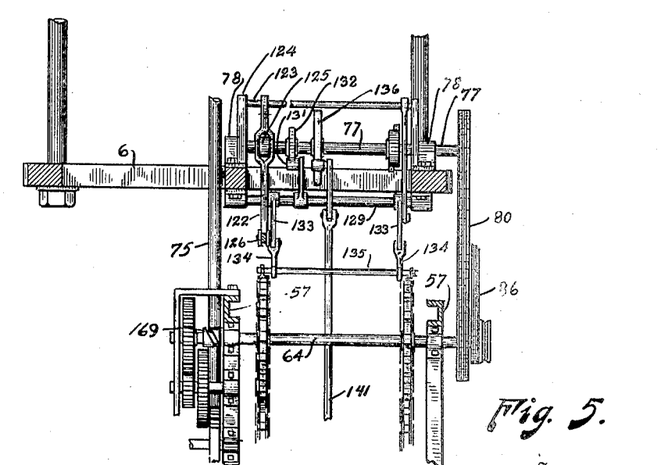
Fig. 5 is a section taken on line 5—5, Fig. 4.
Figure 6:
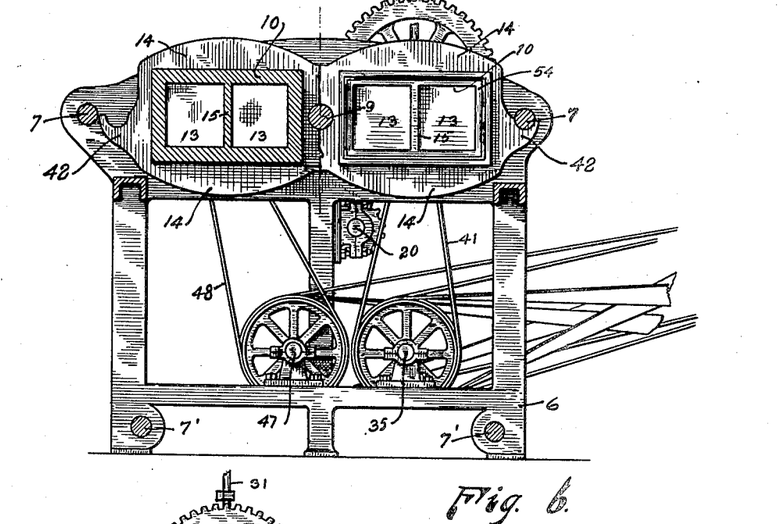
Fig. 6 is a section taken on line 6—6, Figs. 1 and 2.
Figure 7:
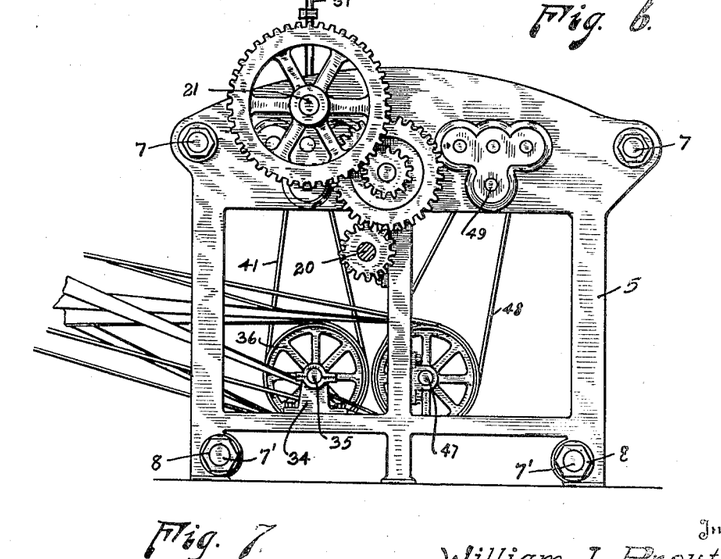
Fig. 7 is an end elevation taken on line 7—7, Fig. 2 with drive shaft shown in section.

I have mentioned that the conveyor belt 63 is moved intermittently and I shall now describe the mechanism by means of which this intermittent movement is effected. A shaft 129 is mounted horizontally on the front side of frame 6. This shaft carries a rearwardly extending arm 130 having a roller 131 attached thereto. The roller 131 extends into the plane of a cam 132 which has two substantially opposite cam surfaces of unequal length, best shown in Fig. 2. Arms 133 are secured to the shaft 129 and extend forwardly in the direction of the conveyor 63. To the forward ends of arms 133 there are connected bars 134 which are connected at their free ends by a rod 135, the ends of which are adapted to engage beneath the hooks 68 in the manner shown in Figs. 2 and 5. As shaft 77 is rotated, the cam surfaces 132 strike the roller 131 and rotates the shaft 129 in a counter-clockwise direction (Fig. 2). This moves the bars 134 upwardly and causes the conveyor to be moved the distance between the hooks 68.

Shaft 77 carries another cam 136 which is provided with two symmetrical cam surfaces. Pivoted to a stationary bracket 137 is a lever 138 whose upper end is curved rearwardly and carries a roller 139 which lies in the plane of the cam 136 so that the cam surfaces strike the roller and rotate the lever clockwise about its pivot 140. A rod 141 is pivoted at 142 to the end of the lever 138. The other end of the rod 141 is pivoted to the lower end of lever 143 (Fig. 8) whose upper end is provided with a slot 144 which cooperates with the rod 145 which connects the bearing blocks 71. When the cam surfaces of the cam 136 engage the roller 139 the lever 138 will be rotated counter-clockwise about its pivot 140 (Fig. 8) and will move the lever 143 into dotted line position. The movement of lever 143 carries with it the arm 72 and roller 73 and bends the conveyor 63 into the dotted line position shown in Fig. 8. When the conveyor is bent into the dotted line position, the shaft 65 which is mounted in the slidable bearing blocks 66 will move upwardly in the slot provided for this purpose so as to provide the necessary slack, and when the cam 136 permits the parts to resume normal position, the weights 146 will move the shaft down to its normal position.

Figure 9:
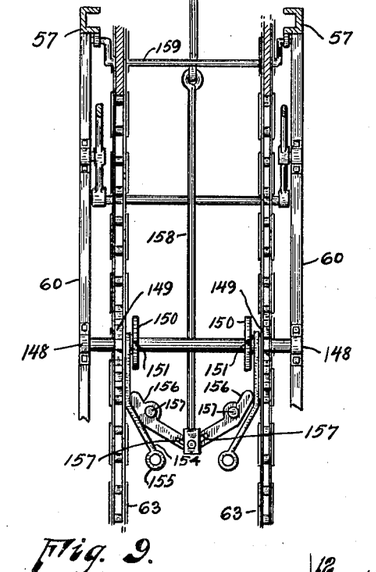
Fig. 9 is a section taken on line 9—9, Fig. 8 and shows the parts in normal position.
Figure 10:
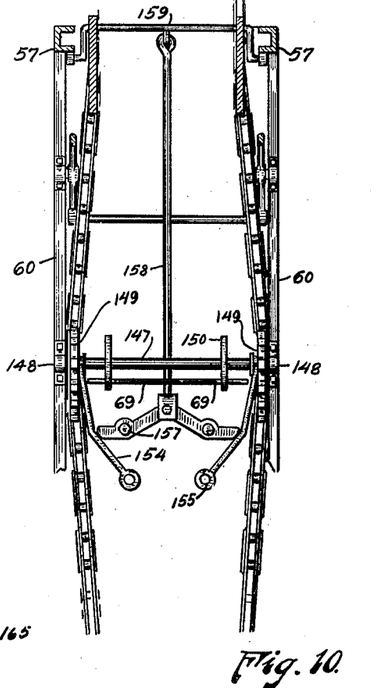
Fig. 10 is a view similar to that in Fig. 9 and shows the chains spread so as to permit the carrier rods to be dropped into place below the chains.
Figures 11, 12:
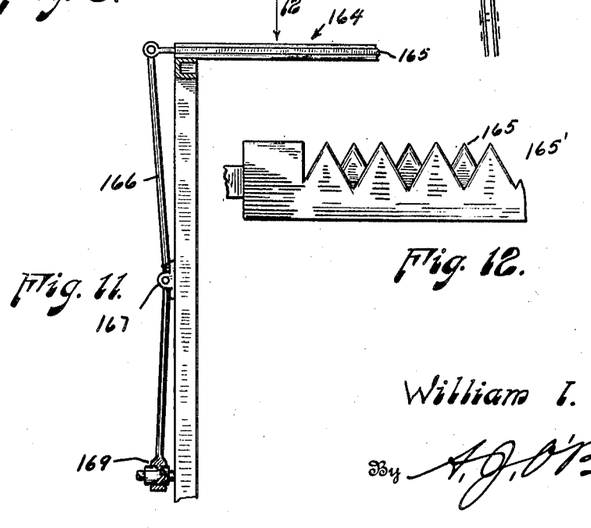
Fig. 11 is a detail showing the pitmen for operating the sickle and the method of operating the pitmen.
Fig. 12 is a view looking downwardly in the direction of the arrow 12 in Fig. 11.

For the purpose of automatically feeding the rods 69 into position to be engaged by the hooks 68, I provide the following mechanism. Intermediate the lower parallel position of the chains of the conveyor 63, I pivot a shaft 147 which is best shown in Figs. 8, 9 and 10. This shaft is rotatably mounted in bearings 148. Slidably, but non-rotatably connected to the shaft are two sprocket wheels 149 which cooperate with the conveyor chains 63 so that the shaft will rotate in accordance with the movements of the chain. The sprocket wheels are preferably of such diameter that the shaft 147 will be rotated one-half of a revolution, while the chains travel the distance between hooks 68. The sprocket wheels may be larger than this and may rotate the shaft one-third or one-fourth of a revolution while the chains move the distance between the hooks 68, but in the present drawing the shaft is rotated 180 degrees. Secured to the shaft 147 are two disks 150, each of which has notches 151 in the edges thereof. These notches are of sufficient depth to accommodate a rod 69 in the manner shown in Fig. 8. A hopper 152 is provided for the reception of the rods 69. As the chain moves, the disks 150 are rotated in the direction of the arrow (Fig. 8) and carry the rods 69 downwardly. The rods are longer than the width of the conveyor and consequently it becomes necessary to spread the chains in order that they may be deposited on the guides 153 (Figs. 2 and 8). The spreading of the chains is accomplished by the following means: Two bars 154 are pivoted to a stationary part of the machine at point 155. The free ends of these bars contact with the inside of the wheels 150 in the manner shown in Figs. 9 and 10. Two cam members 156 are pivoted at points 157. One end of each cam contacts with the bars 154 and the other ends overlap and are provided with elongated openings 157. A rod 158 is pivoted at one end to the overlapping ends of the cams 156 and has its other end connected to a lever 159 which is pivoted at its lower end to a stationary part and has its upper end projecting over the plane of the bottom of the conveyor so that the rods 69 will strike the same as they are moved forwardly. As the lever 159 is moved from the position shown in Fig. 8 in a clockwise direction, it will carry with it the rod 158 and move the cams 156 from the position shown in Fig. 9 to that shown in Fig. 10. This will spread the chains. The spreading of the chains is timed so that it takes place just before the wheels 150 come to a position in which a rod 69 is to be deposited and therefore the rod will drop from the notches 151 down upon the guides 153 where the hooks 68 will catch them and carry them along. As the conveyor 63 is moved along by the intermittent motion device, the rods will finally be carried to the point marked 160 from which they will be moved by gravity downwardly upon the guides 161 and onto the conveyor 162 which carries them into and through the drying chamber. The macaroni 163 will not always have the two sides of equal length and I have therefore provided a trimmer 164 which consists of a sickle 165 that reciprocates past the guards 165' and cuts the ends of any macaroni that extends lower than the sickle. For the purpose of reciprocating the sickle, I have provided pitmen 166 which are pivoted at 167. The upper end is pivoted to the sickle 165 and the lower end cooperates with a cam 169 which is secured to a rotating shaft 64. The cam oscillates and rocks the pitmen on the pivot 167 and reciprocates the sickle. The macaroni ends that are trimmed off drop into a hopper 171.

It is sometimes desirable to cut the macaroni into short pieces instead of forming it into long strips or tubes and whenever that is desired, the conveyors 82 and 83 are removed and a knife 56 slidably mounted in front of the die. This knife is given an intermittent up and down movement by means of a cam 172 and a connecting rod 173. This cam is heart-shaped and when the point strikes the roller 174 it will move the knife upwardly and then quickly reverse the movement and move it downwardly to its central or neutral position. When the point 175 strikes the roller, it will quickly move it downwardly and then back to normal position and in this manner the macaroni is alternately cut above and below the neutral line of the die, thus forming short pieces. When short pieces are cut, the conveyor 63 and related parts do not operate.

Figure 13:
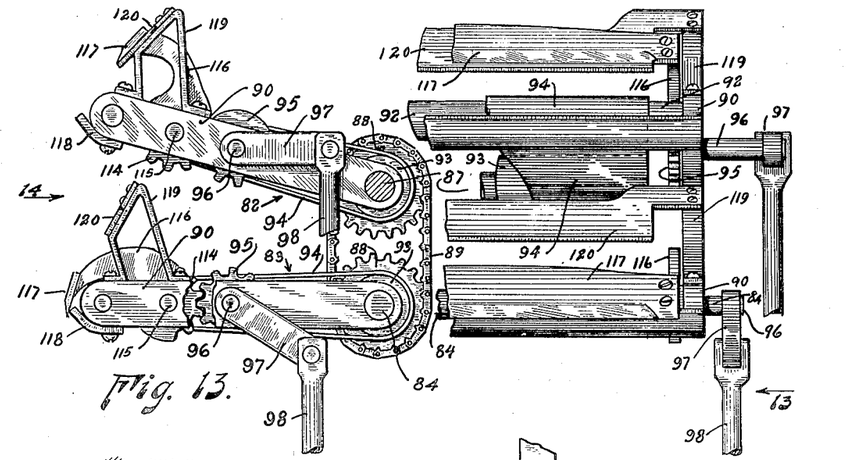
Fig. 13 is a detail showing the means for operating the conveyors and the cutting knives, this view being taken looking in the direction of the arrow 13 in Fig. 14.

The operation of my device will now be described and is as follows:

The parts being in the position shown in Fig. 1, the operator will fill the lowermost cylinder with dough, employing in this connection the piston 45 in the manner described. It may be necessary to place a bar across the upper cylinder and employ the piston 17 to force the cylinders against the support 6. This expedient will, of course, not be necessary except when both cylinders are empty. The loaded cylinder is then rotated into position in front of the piston 17 and clutch member 30 on shaft 27 moved into operative relation with the wheel 29. This will cause the screws 18 to rotate at high speed and move the piston 17 against the dough in the cylinder and also move the pistons against the stop 6, after which the lever 31 is moved so as to connect clutch member 23 with the gear wheel 22, after which the piston 17 will be moved slowly but with great force against the dough and extrude the same through the dies 43. The extruded macaroni will lie in a close layer on the conveyor belts 94 which move at a greater rate than the macaroni and therefore tends to stretch the same. Let us now assume that the conveyors are held in the position shown in Figs. 2 and 13 and that the macaroni projects downwardly over the front of the lower conveyor. The cam 132 will then strike the roller 131 on the end of the lever 130 and move the bars 134 upwardly whereby the conveyor 63 is moved a distance equal to the space between the hooks 68. The bar 69, which is shown directly below the conveyor will be moved to a space intermediate the two conveyors and will carry a layer of macaroni which will hang down on the front side and extend to the conveyor at the other side. The cam 136 will now begin to operate on the lever 138 and bend the conveyor forwardly into the position shown in dotted lines in Fig. 8. When the parts reach substantially the position shown by the dotted lines in Fig. 8, the cam surface 113 will strike the bell crank lever 106 and remove the end 107 from beneath the pin 109 and this will permit the spring 103 to function and move the parts 101 and 98 downwardly, which will cause the knife 117 to move into the position shown in Fig. 13 (lower conveyor) and cut the macaroni which will now hang doubled over from the bar 69. A set of cams and levers similar to those shown in Figs. 13 and 14 in connection with the lower conveyor are provided for the upper conveyor, but are timed so as to operate at the proper time to suit the conditions existing in connection with the upper conveyor. As soon as the knife has operated to cut the macaroni, cam 127 permits the conveyors to drop down to a position in which the upper conveyor is substantially horizontal and the lower one slants downwardly and at the same time the cam 136 permits the conveyor to move from the dotted line to the full line position. This brings the bar 69 underneath the strips of macaroni which project over the edge of the upper conveyor. The long cam portion of the cam 132 now operates to move the conveyor belt upwardly a greater distance than it was moved upwardly the time before. Attention is called to the obvious fact that when the lower conveyor is horizontal as shown in Figs. 2 and 13 it projects out farther than the upper conveyor, which is inclined, and that therefore the bars 69 receive macaroni from the lower conveyor only. When the position of the conveyors are shifted so that the upper conveyor is horizontal and the lower inclined, the upper conveyor will project out farther than the lower one and therefore the bar 69 will receive its load from the upper conveyor only. The mechanism described then operates to move the conveyor into dotted line position (Fig. 8), after which the cam which corresponds to cam 111 operates to release the knife which cuts the macaroni. The knives 117 are opened by the action of the projection 112 which engages under the pin 110 and moves the rod 101 upwardly. Every time the conveyor 63 moves the distance between each pair of hooks 68, the mechanism described above deposits a bar 69 on the guide 153 where it can be engaged by the hooks 68 and carried along. As the bars pass over the cutter 164 the ends of the macaroni are trimmed in the manner explained. After the bars carrying the macaroni are deposited on the conveyor 162, they are carried along through a chamber where they are subjected to a current of air and are dried. The conveyor 162 may be as long as desired and move only fast enough to provide space for the rods as they are delivered by the conveyor 63 so that the macaroni when it reaches the end of the conveyor is in condition to be packed for shipment. As the bars 69 are released they are deposited in the hopper 152 from which they are led to the conveyor 63. The conveyor 162 may be driven from the shaft 64 in the manner shown in Fig. 8.

From the above, it will be apparent that I have invented a machine that will manufacture macaroni and which will be automatic in its operation from the time the dough is fed into the cylinder to the time the macaroni is ready to be packed for shipment. Where a greater capacity than that shown is required, the dies may be made with three or more groups of holes and three or more conveyors, such obvious changes as may be required for this modification being readily accomplished.

Having now described my invention, what I claim is:

1. A macaroni machine comprising, in combination, means for transforming the dough into tubes; means for arranging said tubes in a layer; means comprising a conveyor belt for receiving said tubes and for maintaining them straight; means for inserting a bar under each layer of tubes; means for draping the tubes over the bar; means for cutting the layer of tubes; and means comprising a conveyor for transferring said tubes.

2. A macaroni machine comprising, in combination, means for transforming the dough into tubes; means for arranging said tubes in a layer; means comprising a conveyor belt for receiving said tubes and for maintaining them straight; means for inserting a bar under each layer of tubes; means for draping the tubes over the bar; means for cutting the layer of tubes; means comprising a conveyor for transferring said tubes; and means for trimming the ends of the macaroni tubes.

3. A macaroni machine comprising, in combination, means for transforming the dough into tubes; means for arranging said tubes in a layer; means comprising a conveyor belt for receiving said tubes and for maintaining them straight; means for inserting a bar under each layer of tubes; means for draping the tubes over the bar; means for cutting the layer of tubes; means comprising a conveyor for transferring said tubes; means for trimming the ends of the macaroni; and a second conveyor for transporting the macaroni through a drying chamber.

4. In a macaroni machine, in combination, a pair of spaced supports rigidly connected; a shaft having its ends connected to the said supports; a pair of cylinders mounted on said shaft so as to be slidable and rotatable thereon, said cylinders being spaced equidistantly from the shaft; stop means for limiting the rotary movement of said cylinders about said shaft to 180 degrees; a spring between the cylinders and one support, said spring tending to move the cylinders from the support; a die carried by said support and adapted to cooperate with one of said cylinders; a piston mounted on the other support, said piston being adapted to cooperate with a cylinder for the purpose of extruding the contents thereof through the die; means for moving said piston in either direction, said means comprising a pair of screws; means for rotating said screws slowly in a direction to move the piston into the cylinder; and separate means for moving the piston at a greater speed in either direction.

5. In a macaroni machine, in combination, a pair of spaced supports rigidly connected; a shaft having its ends connected to the said supports; a pair of cylinders mounted on said shaft so as to be slidable and rotatable thereon, said cylinders being spaced equidistantly from the shaft; stop means for limiting the rotary movement of said cylinders about said shaft to 180 degrees; a spring between the cylinders and one support, said spring tending to move the cylinders from the support; a die carried by said support and adapted to cooperate with one of said cylinders; a piston mounted on the other support, said piston being adapted to cooperate with a cylinder for the purpose of extruding the contents thereof through the die; means for moving said piston in either direction, said means comprising a pair of screws; means for rotating said screws slowly in a direction to move the piston into the cylinder; separate means for moving the piston at a greater speed in either direction; a second piston adapted to cooperate with the other cylinder; and means comprising a pair of screws threadedly connected with the piston for moving the same in either direction, said last named piston being shorter than the first named piston.

6. In a macaroni machine, in combination, a pair of spaced supports, one of which carries a rectangular die having a plurality of groups of holes; means comprising a cylinder and piston for forcing macaroni dough through the holes in said die; a conveyor for each group of holes, said conveyors being so located that the material extruded through each group of holes will be deposited on a conveyor, said conveyors being pivotally connected to the support and connected to each other in such a manner that all will move simultaneously about their pivots; shearing means at the end of each conveyor; and means for periodically operating the shearing means.

7. In a macaroni machine, in combination, a pair of spaced supports, one of which carries a rectangular die having a plurality of groups of holes; means comprising a cylinder and piston for forcing macaroni dough through the holes in said die; a conveyor for each group of holes, said conveyors being so located that the material extruded through each group of holes will be deposited on a conveyor, said conveyors being pivotally connected to the support and connected to each other in such a manner that all will move simultaneously about their pivots; shearing means at the end of each conveyor; means for periodically operating the shearing means; another conveyor placed in front of the first mentioned conveyors, said last mentioned conveyor having means for carrying bars; means for intermittently moving said conveyor in a vertical direction in front of the first mentioned conveyors; and means for periodically bending said last mentioned conveyor away from the first conveyors.

8. A macaroni machine comprising a pair of supports; means for rigidly connecting them together; a die carried by one support; a shaft having its ends secured to said supports; a pair of cylinders rotatably and slidably mounted on said shaft; means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni; and means for automatically cutting the macaroni into predetermined lengths as it is extruded from the die.

9. A macaroni machine comprising a pair of supports; means for rigidly connecting them together; a die carried by one support; a shaft having its ends secured to said supports; a pair of cylinders rotatably and slidably mounted on said shaft; means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni; said die having two or more groups of holes so arranged that the extruded macaroni may be side by side in a single layer; conveyors pivotally connected in front of said die; means for moving said conveyors at a speed greater than that at which the macaroni is extruded; and means on the end of the conveyor for cutting the macaroni into predetermined lengths.

10. A macaroni machine comprising a pair of supports; means for rigidly connecting them together; a die carried by one support; a shaft having its ends secured to said supports; a pair of cylinders rotatably and slidably mounted on said shaft, means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni; said die having two or more groups of holes so arranged that the extruded macaroni may be side by side in a single layer; conveyors pivotally connected in front of said die; means for moving said conveyors at a speed greater than that at which the macaroni is extruded; means on the end of the conveyor for cutting the macaroni into predetermined lengths; and means for periodically moving said conveyors about their pivots.

11. A macaroni machine comprising a pair of supports; means for rigidly connecting them together; a die carried by one support; a shaft having its ends secured to said supports; a pair of cylinders rotatably and slidably mounted on said shaft; means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni; said die having two or more groups of holes so arranged that the extruded macaroni may be side by side in a single layer; conveyors pivotally connected in front of said die; means for moving said conveyors at a speed greater than that at which the macaroni is extruded; an endless conveyor mounted so as to have a portion thereof movable in a vertical direction directly in front of the first mentioned conveyors, said conveyor comprising two parallel endless chain members each provided with a plurality of equidistantly spaced hooks for carrying bars, said conveyor and bars being so related to the first mentioned conveyors that the bars will engage under the macaroni as it hangs over the end of one of the first mentioned conveyors; means for intermittently moving the conveyor in a vertical direction; and means for intermittently bending the same.

12. A macaroni machine comprising a pair of supports; means for rigidly connecting them together; a die carried by one support; a shaft having its ends secured to said supports; a pair of cylinders rotatably and slidably mounted on said shaft; means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni; said die having two or more groups of holes so arranged that the extruded macaroni may be side by side in a single layer; conveyors pivotally connected in front of said die; means for moving said conveyors at a speed greater than that at which the macaroni is extruded; an endless conveyor mounted so as to have a portion thereof movable in a vertical direction directly in front of the first mentioned conveyors, said conveyor comprising two parallel endless chain members each provided with a plurality of equidistantly spaced hooks for carrying bars, said conveyor and bars being so related to the first mentioned conveyors that the bars will engage under the macaroni as it hangs over the end of one of the first mentioned conveyors; means for intermittently moving the conveyor in a vertical direction; means for intermittently bending the same; and means for feeding bars to said conveyor.

13. A macaroni machine comprising a pair of supports; means for rigidly connecting them together; a die carried by one support; a shaft having its ends secured to said supports; a pair of cylinders rotatably and slidably mounted on said shaft; means on the cylinders cooperating with means carried by the supports for limiting the rotation of the cylinders to 180 degrees, said die being so located that it will register with one of the cylinders when it is in operative position; a piston supported from one of said supports; means for moving said piston in either direction, said means comprising a pair of screws operatively connected therewith, said piston being adapted to cooperate with said cylinder and die to force dough through the die so as to form tubular macaroni, said die having two or more groups of holes so arranged that the extruded macaroni may be side by side in a single layer; conveyors pivotally connected in front of said die; means for moving said conveyors at a speed greater than that at which the macaroni is extruded; an endless conveyor mounted so as to have a portion thereof movable in a vertical direction directly in front of the first mentioned conveyors, said conveyor comprising two parallel endless chain members each provided with a plurality of equidistantly spaced hooks for carrying bars, said conveyor and bars being so related to the first mentioned conveyors that the bars will engage under the macaroni as it hangs over the end of one of the first mentioned conveyors; means for intermittently moving the conveyor in a vertical direction; means for intermittently bending the same; means for feeding bars to said conveyor; and another conveyor means adapted to receive the bars from the last named conveyor and to transport the same through a drying chamber.

In testimony whereof I affix my signature.

WILLIAM I. PROUT, Jr.